United States Patent [19]
Miyasaka et al.

[11] Patent Number: 5,867,622
[45] Date of Patent: Feb. 2, 1999

[54] MODULE FOR OPTICAL COMMUNICATION

[75] Inventors: Masahiro Miyasaka; Shigemasa Enoeda; Toshimichi Yasuda, all of Nagano; Noritane Kimoto, Kanagawa, all of Japan

[73] Assignee: Kyocera Corporation, Kyoto, Japan

[21] Appl. No.: 892,824

[22] Filed: Jul. 15, 1997

[51] Int. Cl.[6] .................................................. G02B 6/36
[52] U.S. Cl. ............................... 385/88; 385/93; 385/89
[58] Field of Search .......................................... 385/88–94

[56] References Cited

U.S. PATENT DOCUMENTS 5,408,559  4/1995  Takahashi et al. ......................... 386/89

*Primary Examiner*—Phan T. H. Palmer
*Attorney, Agent, or Firm*—Loeb & Loeb LLP

[57] ABSTRACT

Bi-directional and uni-directional optical communication and transmission modules minimize crosstalk during use by diffusing reflected and returned stray light. A bi-directional module includes a transmission optical element for transmitting light into the module, a reception optical element for receiving light in the module, an optical fiber for guiding light to and from the transmission and reception optical elements, respectively, a beam splitter for allotting light received from the transmission optical element and the optical fiber, and a light non-return chamber for receiving and diffusing stray light reflected by the beam splitter from the transmission optical element and the optical fiber. A uni-directional module includes a light non-return chamber for receiving and diffusing return light reflected by a beam splitter from at least one optical device arranged in the module. In other aspects of the invention, a variety of optical modules are provided wherein component parts are either aligned along a central axis of a through-hole of the module, are adjustable to maintain an optimum optical axis for light transmission through the module, or are arranged to mutually correct for the axial shift of light in any given component to minimize the total axial shift of light entering and exiting the module.

16 Claims, 6 Drawing Sheets

MODULE FOR OPTICAL COMMUNICATION

BACKGROUND OF THE INVENTION

The present invention relates to a module for optical communication where optical elements for transmission and for reception are used in directional communications, or to a module for optical communication provided with optical receiving elements for monitor use.

Figure 5:
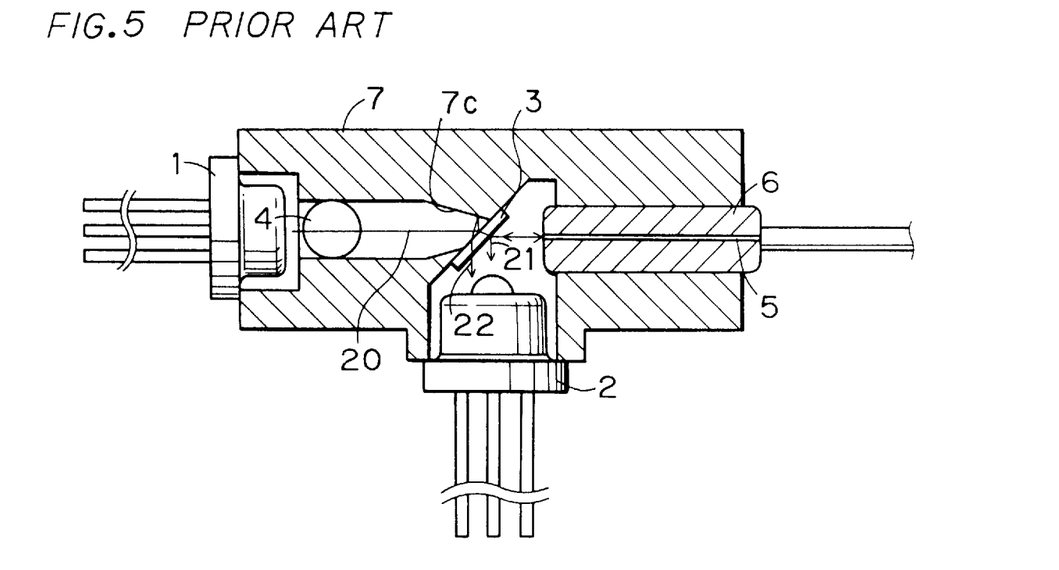
FIG. 5 is a longitudinal sectional view showing the conventional optical communication module.

A module for directional communication shown in FIG. 5 is arranged in the body 7 so that the optical element 1 for transmission use and the optical element 2 for reception can become orthogonal in their mutual optical axes. A beam splitter plate 3, as an allotment body for light signals in the crossing portion of the mutual optical axes, is included at 45° with respect to the mutual optical axes. A ferrule 6 having retained an optical fiber 5 is arranged in the optical axis direction of the optical element 1 for transmission.

The transmission light 20 outputted from the optical element 1 for transmission use passes through a lens 4, and is partially reflected by a beam splitter plate 3 to transmit the remaining portion of it. The transmitted transmission light 20 is guided out by the optical fiber 5. The received light 21 introduced from the optical fiber 5 is partially transmitted by the beam splitter plate 3 and is reflected in its remaining portion. The received light 21 reflected becomes incident into the optical element 2 for reception, thus making it possible to communicate in both directions.

The beam splitter plate 3, a glass plate, partially reflects the light signal and conducts a distribution operation through transmission of the remaining portion. As a distribution body of light signals, a prism type splitter or a hologram is used.

However, the module for bi-directional communication shown in FIG. 5 has a problem in that the component, reflected by the beam splitter 3, of the transmission light 20 outputted from the optical element 1 for transmission includes further stray light 22 transmitting through the beam splitter 3 by reflection by the inner wall face 7c of the body 7, and the stray light 22 becomes incident into the optical element 2 for reception to make the crosstalk characteristics worse.

SUMMARY OF THE PREFERRED EMBODIMENTS

Accordingly, an object of the invention is to prevent stray light from being caused by the reflection of the transmission light, in a module for bi-directional optical communication, to improve the crosstalk characteristics.

The invention is characterized in that in a module for optical communication where an allotment body for distributing the light signal to respective optical elements is provided among the optical element for transmission and the optical element for reception, and the optical fiber for guiding-out and in the light signal to these optical elements, a light nonreturn chamber is provided in a body portion at a position where the light is outputted from the optical element for transmission and the reflection light from the allotment body hits.

Furthermore, the invention is characterized in that in a module for optical communication where a light guiding-in means and a light guiding-out means are provided and an allotment body of the light signal is provided among them, and an optical receiving element for detecting the light signal distributed by the allotment body is provided, a light nonreturn chamber is provided in a body at a position where the reflection light of the return light reflected by the allotment body hit, i.e., the return light of the light signal having passed through the allotment body and having been reflected by another member.

The light nonreturn chamber of the invention includes a portion having the function of preventing the incident light from being reflected in its opposite direction.

According to the invention, the crosstalk characteristic is improved, because the reflection light outputted from the optical element for transmission and reflected by the allotment body are absorbed, diffused by the light nonreturn chamber, and are further reflected into stray light, thus prevented from being incident into the optical element for reception.

According to the invention, even in the module for optical communication not employing bi-directional use, the return light from the light guiding-out side is prevented from becoming incident into the optical receiving element through the reflection by the allotment body.

The invention relates to a module for optical communication or the like.

Figure 9:
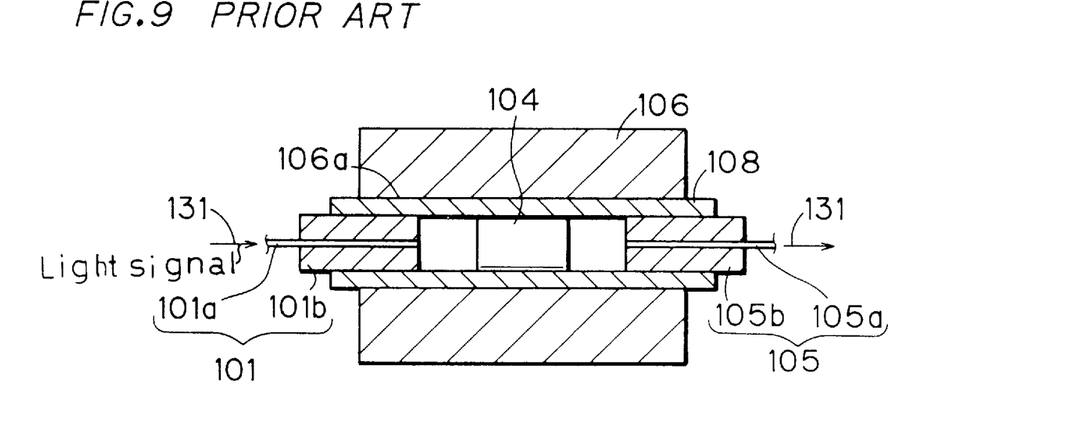
FIG. 9 is a longitudinal sectional view of the conventional optical communication module.

A conventional module for optical communication shown in FIG. 9 has a light guiding-in means 101 composed of a ferrule 101b provided with an optical fiber 101a, a light guiding-out means 105 composed of a ferrule 105b provided with a optical fiber 105a, and an optical parts, 104 disposed between them, arranged linearly within a pipe 108, with the pipe 108 being provided within a through hole 106a of the body 106.

The optical parts 104 include, for example, an isolator, a WDM filter, a beam splitter, a lens and so on. A light signal 131 introduced from the light guiding-in means 101 is passed through the optical parts 104, so as to guide out the signal from the light guiding-out means 105.

The respective ferrules 101b, 105b, and the optical parts 104 are spliced with a pipe 108, with YAG welding or the like, by prior position alignment of them within a pipe 108. Then, the module for optical communication is constructed by a splicing operation of the whole pipe 108 with the body 106. To splice the pipe 108 with the body 106, a welding hole (not shown) for communication with the exterior in the inner wall of the through hole 106a is provided to conduct the YAG welding operation through the welding hole.

Figures 10, 11:
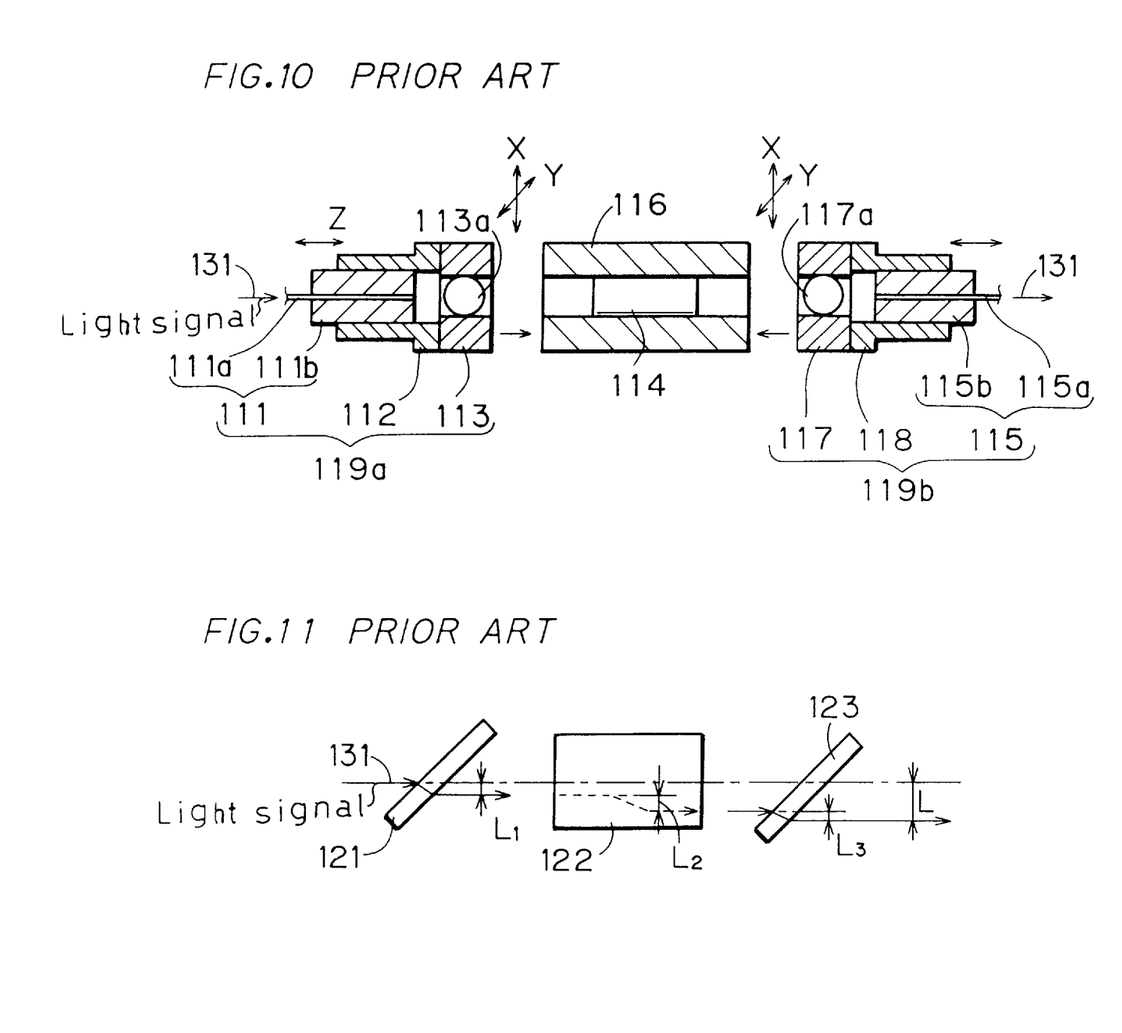
FIG. 10 is an explosive sectional view showing the conventional optical communication module.
FIG. 11 is a schematic view showing the arrangement of the optical parts of the conventional optical communication module.

The module for optical communication shown in FIG. 10 is provided with a collimate lens 113a and 117a for converting the optical signal 131 into collimate (parallel) light. The light guiding-in means 111 composed of ferrule 111b provided with an optical fiber 111a is spliced with the ferrule support member 112, and the lens support member 113 for retaining the collimate lens 113a is spliced in positioning alignment in advance with the ferrule support member 112, on the light guiding-in side of the module for the optical communication, to form a subassembly 119a. A light guiding-out means 115 composed of ferrule 115b provided with optical fiber 115a is spliced with the ferrule support member 118, and a lens support member 117 for retaining the collimator lens 117a is spliced in advance through positioning alignment with the ferrule support member 118, on the light guiding out side, so as to form a subassembly 119b.

A splicing operation is conducted with YAG welding, while the subassemblies 119a and 119b are in positional alignment respectively in the XY direction with both ends of the body 116 provided with the optical parts 114 in the interior thereof. The positional alignment in a Z axial direction is conducted when the ferrule 111b and 115b are respectively spliced with the ferrule support members 112 and 118.

However, a module for optical communication as shown in FIG. 9 has a third problem in that the size cannot be made small. The number of the parts is greater, because the pipe 108 is necessary. The pipe 108 has to be spliced with the body 106, after the respective members have been spliced with the pipe 108, and the manufacturing step is complicated.

It is difficult to splice the inside optical parts 104 within the through hole 106a of the body 106 with YAG welding even if each member is to be spliced directly with the body 106 without the pipe 108.

A prior art module for optical communication of such construction shown in FIG. 10 has a fourth problem in that the loss of the optical signal becomes larger, because the inferior parallel degree of the splicing face between the subassemblies 119a, 119b on both sides, and the body 116, puts the optical axis on the guiding-in side and the guiding-out side out of place. Namely, when the respective subassemblies 119a and 119b are to be spliced with the body 116, a improper angle of the optical axis cannot be adjusted although positional alignment in the XY direction can be conducted.

These modules for optical communication have a fifth problem in that large axial shift L is caused finally when these axial shifts are met, because of the axial shifts $L_1$, $L_2$ and $L_3$ of the incident light and the output light of the light signals 131 respectively in each of optical parts 121, 122 and 123 as shown in FIG. 11, although a plurality of optical parts are provided within the bodies 106 and 116.

When the large axial shift L is caused, it becomes difficult to conduct the adjustment in an assembling operation, or the effective diameter of the optical parts 123 with optical signal 131 being arranged rearwards is put out of place to inconveniently cause the loss.

Accordingly, a third aspect of the invention is characterized in that in a module for optical communication where a light guiding-in means and a guiding-out means provided in both the end portions of the through hole are arranged with the optical parts being provided within a through hole formed in the body, it is secured to a body in a condition where the respective optical axes of the light guiding-in means, the optical parts and the light guiding-out means are aligned to the central axis of the through hole.

A fourth aspect of the invention is characterized in that in a module for optical communication where a light guiding-in means and a light guiding-out means are spliced with both the ends, with optical parts being provided within the body, the positional alignment between the light guiding-in means • guiding-out means and the body is conducted with a lens retaining member respectively interposed between the light guiding-in • guiding-out means and the body.

A fifth aspect of the invention is characterized in that in a module for optical communication where the light guiding-in means and the light guiding-out means are spliced with both the ends, with a plurality of optical parts provided within the body interior portion, the axial shifts between the incident light and the output light in the plurality of optical parts are arranged to be in a direction of mutually being corrected.

The third aspect of the invention can settle a third problem because of fixedly splicing each member directly with the body. The manufacturing step can be simplified and the number of the parts can be reduced. The optical parts of the body interior portion can be spliced easily from another mounting hole crossing with respect to the through hole.

The fourth aspect of the invention can settle a fourth problem, because adjustment can be conducted even when shift exists in the angle of the optical axis. A position for adjustment in the XY direction can be formed in two places between the body and the light guiding-in • guiding-out means.

A fifth aspect of the invention can settle a fifth problem, because the total axial shift amount can be made smaller with mutual axial shifts being corrected in a direction in the arrangement of a plurality of optical parts.

DETAILED DESCRIPTION OF THE PREFERRED EMBODIMENTS

Now referring to the drawings, preferred embodiments of the invention are described below.

Figure 1:
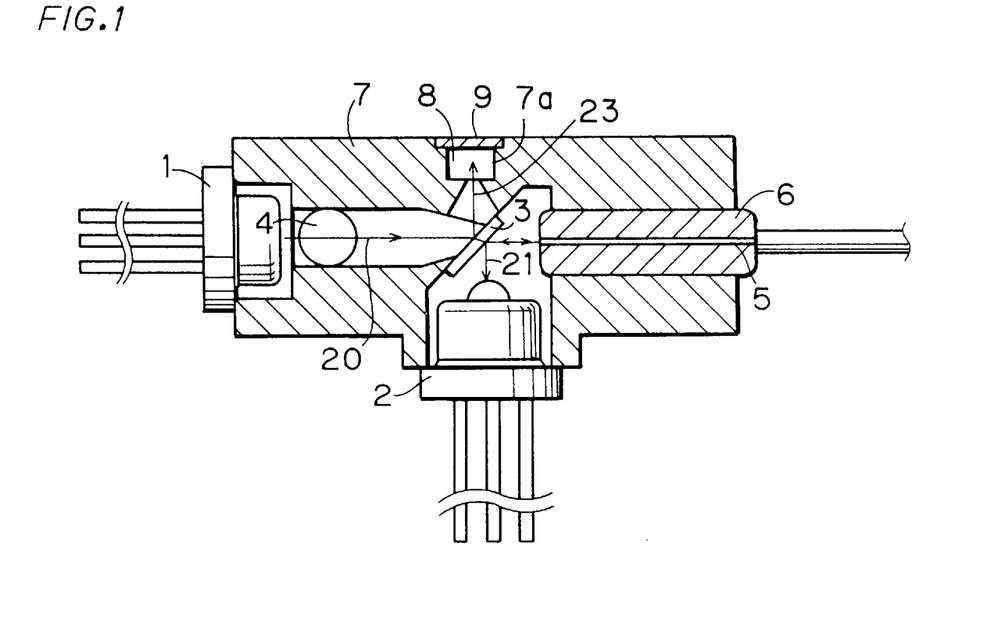
FIG. 1 is a longitudinal sectional view showing a module for optical communication of the invention.

FIG. 1 is a sectional view showing the optical communication module of the invention. A transmission optical element 1 such as a laser diode or the like and a receiving optical element 2 such as a photo diode or the like are arranged in a metal body 7 so that the mutual optical axis may become orthogonal to each other with a beam splitter plate 3 inclined at 45° with respect to the mutual optical axis being provided as an allotment body of the light signals in the respective optical axis orthogonal portion. A ferrule 6 is arranged with the optical fiber 5 being retained in the optical axial direction of the transmission optical element 1.

The transmission light 20 outputted from the transmission optical element 1 passes through the lens 4 and is reflected partially by the beam splitter plate 3, being transmitted in its remaining portion. The transmitted transmission light 20 is guided out by the optical fiber 5. The reception light 21 introduced from the optical fiber 5 is partially transmitted by the beam splitter plate 3 and is reflected in its remaining portion. The reflected reception light 21 becomes incident into the reception optical element 2, thus making it possible to conduct the communication in both directions.

A nonreturn chamber 8 is formed, in the body 7, in a position where reflection light 23 hits, in which the transmission light 20 outputted from the transmission optical element 1 is reflected by the beam splitter plate 3.

Figure 2:
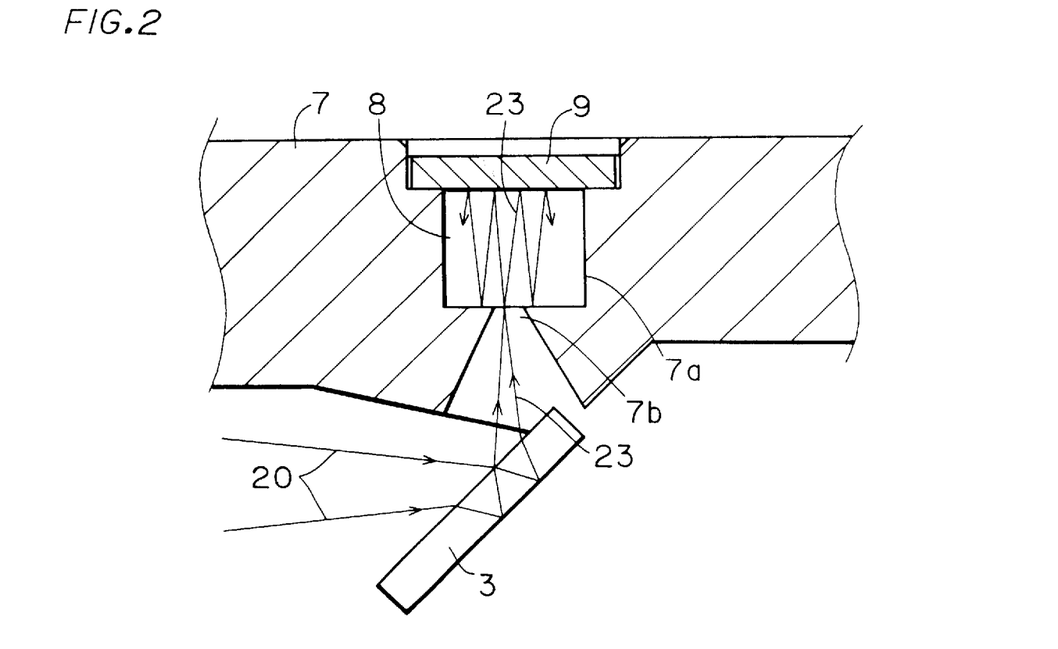
FIG. 2 is an enlarged view showing the vicinity of a light nonreturn chamber of the module of the optical communication of FIG. 1.

As shown in an enlargement view of FIG. 2, the light nonreturn chamber 8 is composed of a concave portion 7a formed in the body 7 and a cover member 9 for covering it with the space being closed except for a pin hole 7b being opened in the inner wall of the body 7. The reflection light 23 is penetrated into the light nonreturn chamber 8 through the pin hole 7b and is diffused and absorbed, reflecting repeatedly within the light nonreturn chamber 8. Therefore, the reflection light 23 is prevented from being incident onto the reception optical element 2 side, thus improving the crosstalk.

The reflection light 23 also becomes focusing light, because the transmission light 20 is tapered reflection light at this time. Form a pin hole 7b in a position where the focusing light 23 is focused, and the pin hole 7b can be made into a minimum size, thus preventing the reflection light 23 from being leaked from the light nonreturn chamber 8. To prevent the leaking of the reflection light 23, the pin hole 7b is preferred to be 0.5 mm or less in diameter.

Form a cover member 9 for covering the light nonreturn chamber 8 with a light absorbing member, and the effect of absorbing the reflection light 23 can be increased. The light absorbing material is made of various materials such as resin, metal, ceramic or the like. The face where at least the reflection light 23 hits is desired to have a color tone of a black. For example, black coat layer provided on the surface of the resin or the metal material of a wholly black color is used. Especially, the various experiments conducted indicate that a black resin of these materials has a higher effect of absorbing the reflection light 23. Concretely, black polycarbonate or ABS resin is preferable. In addition, various resins such as polyethylene, tetrafloroethylene, polypropylene or the like can be used.

The beam splitter plate 3 is a glass plate, which reflects the light signal partially to transmit the remaining portion thereof, so as to effect an allotting operation. Although a prism type splitter or a hologram is used as an allotting body of the optical signal, in addition, a light nonreturn chamber 8 has only to be provided in the inner wall of the body 7 where the reflection light 23 hits, because the reflection light 23 of the transmission light 20 exists in any case.

In the aforementioned example, a bi-directional communication module has been described. The other embodiments of the invention will be described hereinafter.

Figure 3:
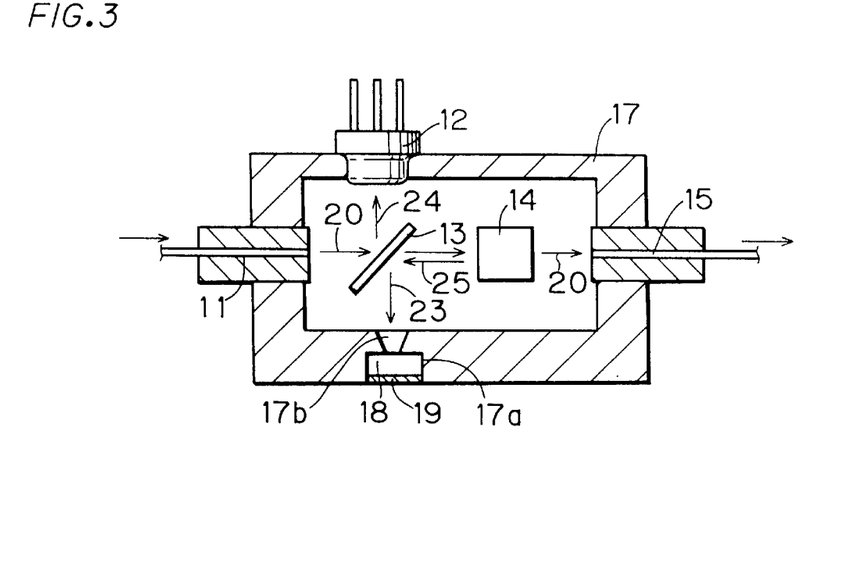
FIG. 3 is a longitudinal sectional view showing another embodiment of the invention.

A light communication module shown in FIG. 3 is used in a light amplifier or the like. A ferrule provided with optical fiber 11, which is a light introducing means, and the optical receiving element 12 are arranged in the body 17 so that the mutual optical axis may become orthogonal to each other. A beam splitter plate 13 for forming the allotment body is provided in a portion where these optical axes are arranged. Ferrules, each having various types of devices 14 and an optical fiber 15 which is a light guiding-out means, are respectively arranged on the optical axis of the ferrule 11.

The transmission light 20 transmitted from the optical fiber 11 side on the instruction side is reflected partially by the beam splitter plate 13 and the reflection light 24 is detected by the optical receiving element 12, so as to monitor whether or not the transmission light 20 is passed. The transmission light 20 having transmitted through the beam splitter plate 13 passes the various devices 14 and is guided out from the optical fiber 15 on the guiding-out side. The device 14 can arrange an isolator, a WDM filter for allowing only light of partial wavelength to pass, a lens or the like, each having a given function.

In the optical communication module of FIG. 3, various processing operations can be conducted by the device 14 while monitoring the transmission light 20.

The optical communication module transmits the transmission light 20 in only one direction. The transmission light 20 having passed the beam splitter plate 13 is reflected by the end face of the device 14 or is reflected by a member placed before the optical fiber 15 on the guiding-out side, so as to cause the return light 25. In the invention, a light nonreturn chamber 18 similar to that in the aforementioned embodiment is provided in a body 17 in a position where the reflection light 23 hits, wherein the return light 25 is reflected by the beam splitter plate 13 which is the allotting body, so as to absorb and diffuse the reflection light 23.

The light nonreturn chamber 18 is composed of a concave portion 17a formed in the body 17 and a cover member 19 for covering it, with the space being closed except for a pin hole 7b being opened on the inner wall of the body 17. The reflection light 23 penetrated into the light nonreturn chamber 18 is diffused and absorbed. Therefore, the reflection light 23 is prevented from being incident into the reception optical element 12.

Figure 4A:
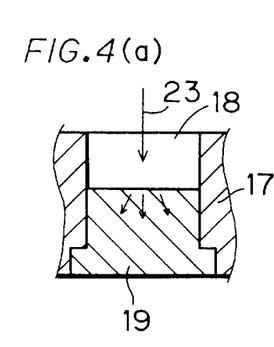
FIGS. 4(a) through (c) show various embodiments of the light nonreturn chamber in the FIG. 3 module for optical communication of the invention.
Figure 4B:
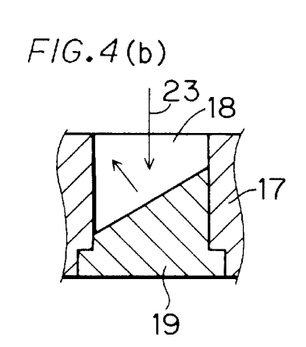

In the aforementioned example, a space closed, except for a pin hole 17b, as the optical nonreturn chamber 18 is shown, but the pin hole 17b is not usually required. Use a material higher in optical absorbing property as a cover member 19 as shown in, for example, FIG. 4(a), and the reflection light 23 can be absorbed. The reflection light 23 can be made not to return onto the optical receiving element 12 side with the end face of the cover member 19 being provided as an inclined face as shown in FIG. 4(b). Also, the reflection light 18 can be diffused with the end face of the cover member 19 as a rough face, as shown in FIG. 4(a).

Figure 4C:
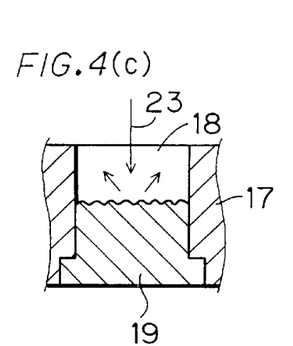

In this manner, the light nonreturn chamber 18 has only to have a function of preventing the light from being reflected in a direction opposite to the incident direction through the absorbing, diffusing of the incident reflection light 23 or the reflection of the light in a different direction.

As an embodiment of the invention, an optical communication module shown in FIG. 1 has been manufactured for trial. The concave portion 7a of the body 7 is covered with a cover member 9 made of polycarbonate or ABS resin, to form the light nonreturn chamber 8. As a comparative example, an optical communication module having a metal body 7 as shown FIG. 5 is prepared.

The measurement of the crosstalk property when bi-directional communication has been conducted using the optical communication of wavelength of 1.31 $\mu$m about the respective optical communication modules confirms that the crosstalk property is improved by 15 dB or more where it is 25 through 30 dB in the embodiment of the invention, while it is approximately 10 through 15 dB in the comparative example.

According to the invention, in a module for optical communication use where an allotment body for allotting the light signal to each optical element is provided between the transmission optical element and the reception optical element, and the optical fiber for guiding-out and guiding-in the light signals to the cross optical elements, the reflection light is prevented from being further reflected and straying by the provision of the light nonreturn chamber in a body at a position where the light is outputted from the transmission optical element and the reflection light from the allotment body hits.

Also, according to the invention, in a module for optical communication where a light guiding-in means and a light guiding-out means are provided, an allotment body of light signals is provided between them, and an optical receiving element for detecting the light signal allotted by the allotment body is arranged, the reflection light is prevented from being further reflected and straying by provision of a light nonreturn chamber in a body portion at a position where reflection light hits, where the return light passes through the allotment body and with return light passing through the allotment body and reflected by another member being reflected by the allotment body.

As a result, the invention can provide an optical communication module superior in crosstalk property and higher in performance which prevents the stray light from becoming incident on the side of the optical receiving optical element.

A third embodiment of the invention will be described hereinafter.

Figure 6:
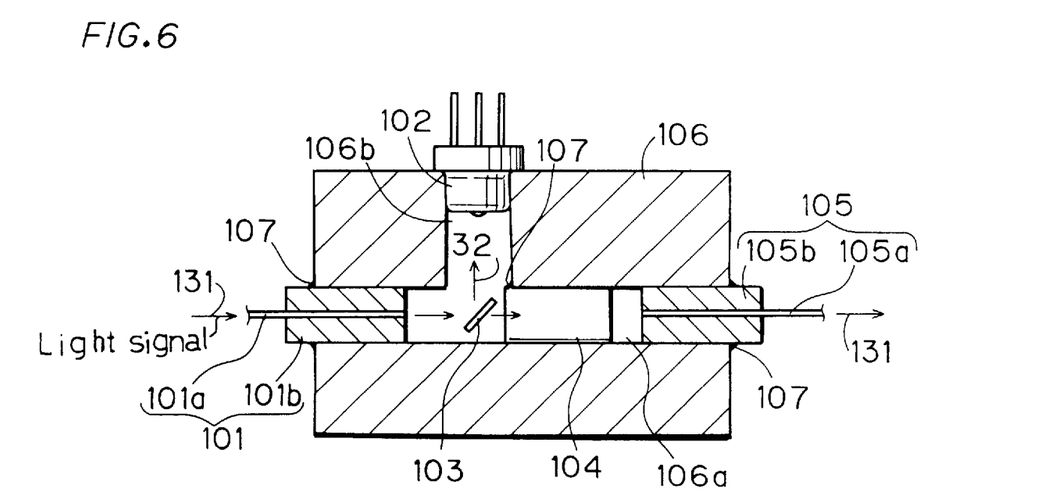
FIG. 6 is a longitudinal view showing the optical communication module of the invention.

FIG. 6 is a sectional view showing an optical communication module to be used for a light amplifier or the like. A through hole 106a and a mounting hole 106b for vertically crossing with respect to it is formed in a metal body 106 of stainless or the like. These members are fixed to the body 106 on a straight line in a condition with the respective optical axis being aligned with the central axis of the through hole 106a, with a light guiding-in means 101 composed of the optical fiber 101a and the ferrule 101b being spliced with one end of the through hole 106a and the optical parts 104 being spliced into the interior portion of the through hole 106a, and a light guiding-out means composed of the optical fiber 105a and the ferrule 105b being spliced with the other end portion. The optical parts 104, adapted to transmit the optical signal 131 and to achieve some function, is, for example, one type of an isolator, a WDM filter, a beam splitter, a lens or the like.

An optical receiving element 102 is spliced with the end portion of the mounting hole 106b. A beam splitter plate 103 inclined at 45° with respect to the central axis of both the through hole 106a and the mounting hole 106b is arranged in the crossing portion between the through hole 106a and the mounting hole 106b.

The light signal 131 introduced from the light guiding-in means 101 is reflected partially by the beam splitter plate 103 and the reflection light 32 is detected by the optical receiving element 102. The light signal 131 which has transmitted through the beam splitter 103 passes through optical parts 104 and is guided externally from the light guiding-out means 105.

Thus, in the light communication module, the light signal 131 to be transmitted is detected partially by the optical receiving element 102 to confirm whether or not the light signal 131 is transmitted properly.

In the light communication module, it is important that the light guiding-in means 101, the optical parts 104, and the light guiding-out means 105 are respectively spliced directly with the body 106. Namely, as each member is inserted into the through hole 106a of the body 106 and is spliced directly by YAG welding 107, such a pipe as that in the conventional example (FIG. 9) is not required. The number of parts can be reduced and the steps of the manufacturing operation can be simplified. The optical axis of each member can be aligned with the through hole 106a itself as a reference.

In such a case, although it becomes difficult to splice the optical parts 104 provided therein, a mounting hole 106b crossing the through hole 106a is used in the invention, and the optical parts 104 spliced by the YAG welding 107 from the mounting hole 106b. Each member can be easily spliced with higher accuracy by such construction as described above.

Furthermore, a method of splicing each member with the body 106 can include not only the YAG welding, but also welding through soldering or gluing. A splicing operation can also be conducted with a method of pressure insertion or the like. In either case, form the through hole 106a with higher accuracy, and the positioning operation of each member can be conducted accurately.

Also, the mounting hole 106b and the optical receiving element 102 can be provided in plural as another embodiment. Although optical fiber 101a is provided as a light guiding-in means 1 in the example of FIG. 6, the light signal 131 from the light emitting element is detected by the optical receiving element 102 with the light guiding-in means 101 as an optical emitting element in another embodiment, and also can be introduced out from the light guiding-out means 105.

Also, as another embodiment, the optical communication module for both directions can be provided with the light guiding-in means 1 as an optical emitting element.

A fourth embodiment of the invention will be described hereinafter.

Figure 7A:
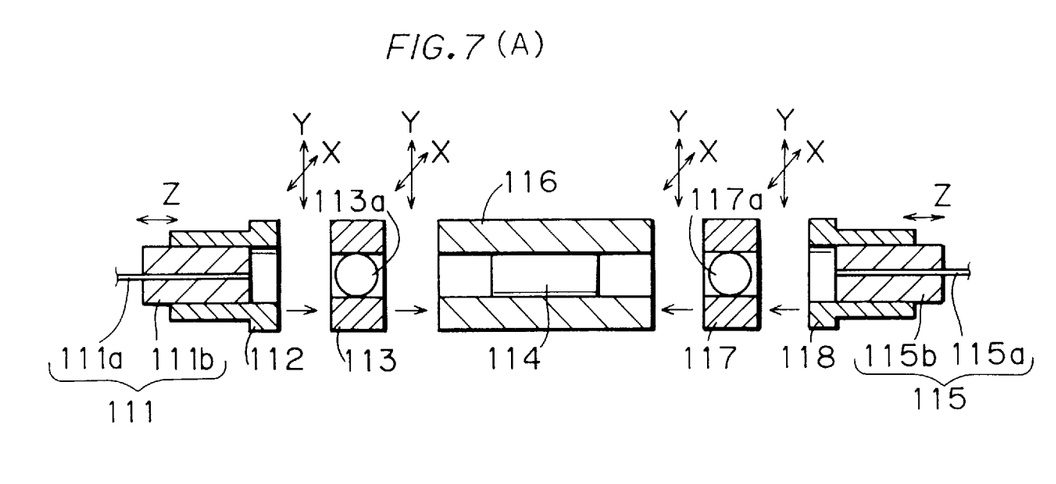
FIG. 7(A) is an explosive sectional view showing the optical communication module of the invention.

The optical communication module shown in FIG. 7(A) is composed of a ferrule support member 112 spliced with the light guiding-in means 111 composed of ferrule 111b provided with the optical fiber 111a, a lens support member 113 with collimate lens 113a being retained, a body 116 with an optical parts 114 as that of the aforementioned example being provided in the interior thereof, a lens support member 117 with the collimate lens 117a being retained, and a ferrule support member 118 spliced with the light guiding-out means 115 composed of a ferrule 115b provided with optical fiber 115a. The splicing operation is adapted to be conducted through the positional aligning of these members in the XY direction to each other.

Namely, the optical communication module is adapted to conduct the positional alignment in the XY direction respectively in a total of four locations between the body 116 and between the lens support members 113 and 117 at both ends thereof, and between these lens support members 113, 117 and the ferrule support members 112 and 118.

Figure 7B:
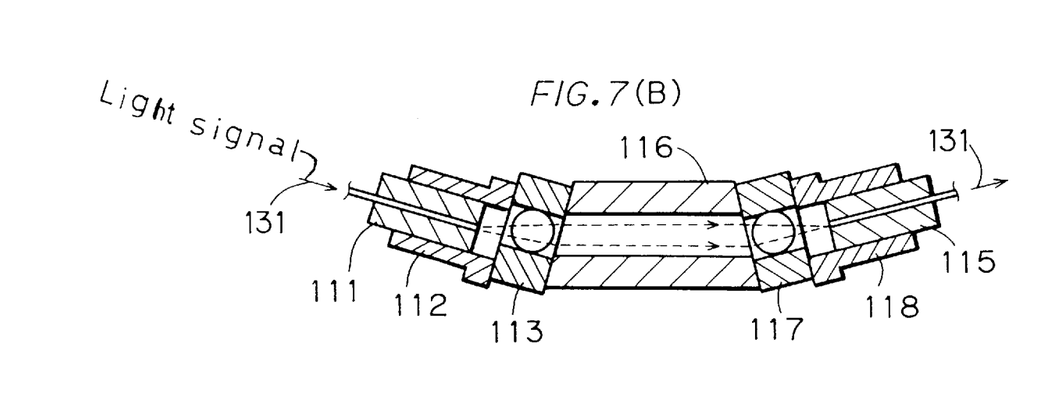
FIG. 7(B) is a sectional view of an assembled module.

Therefore, as exaggerated in FIG. 7(B), even in a case of inferior parallel degree on both the end faces of the body 116, a splicing operation can be conducted by shifting between the lens support members 113, 117 and the ferrule support members 112, 118, and the collimate (parallel) light is brought to the center of the body 116, so as to conduct a lower loss connecting operation.

In this manner, the shifting of the angle of the optical axis can be adjusted by the positional alignment in the XY direction in two locations respectively between the body 116 and the lens support members 113, 117 and the lens support members 113, 117 and the ferrule support members 112, 118.

The positional alignment has only to be conducted in the Z axial direction to splice in advance the ferrule 111b, 115b and the ferrule support members 112, 118.

As another embodiment, the construction shown in FIG. 6 can be provided, with the mounting hole and the optical receiving element, in the body 116.

A fifth embodiment of the invention will be described hereinafter.

In the optical communication module of such construction as shown in FIG. 6 and FIG. 7, a plurality of optical parts can be provided within the bodies 106 and 116. As only the arrangement construction of the optical parts is shown in, for example, FIG. 8, the WDM filter 121 for separating the light communication 131 by wavelength, an isolator 122 and a beam splitter 123 can be arranged on a straight line.

Figure 8:
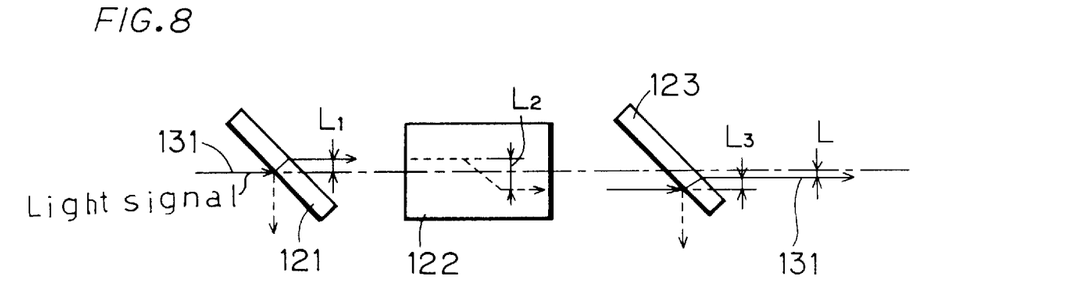
FIG. 8 is a perspective view showing the arrangement of the optical parts of the optical communication module of the invention.

The WDM filter 121 reflects the light signal 131 of, for example, 1.48 μm in wavelength and transmits the light signal 131 of 1.55 μm in wavelength. The WDM filter 121 is arranged obliquely to separate the reflection light of 1.48 μm in wavelength, allowing the light signal 131 of 1.55 μm in wavelength only to be transmitted, so as to function as a filter. As the WDM filter 121 is arranged obliquely at this time, the transmitting light signal 131 is bent to cause the axial shift $L_1$.

Also, the isolator 122 is composed of a polarizer and a rotor combined. The isolator 122 allows the light signal 131 to pass in one direction only (in a right-hand direction in the drawing), and is adapted not to present it in an opposite direction. The light signal 131 causes the axial shift $L_2$ due to refraction in passing through the isolator 122.

The beam splitter 123, an obliquely placed glass plate, reflects one portion of the light signal 131 and divides it, so as to transmit the remaining portion thereof. For example, the reflection light is detected by a light receiving element not shown, and can be monitored. The light signal 131 passing through the beam splitter 123 causes the axial shift $L_3$ due to refraction.

The invention is arranged so that the axial shifts $L_1$, $L_2$ and $L_3$ caused by each of the optical parts may become mutually corrected. The mutually correcting direction means that the axial shift of each of the optical parts is arranged in a direction to make the total axial shift L smaller. In, for example, FIG. 8, the WDM filter 121 is arranged so that an axial shift $L_1$ is caused in the upper direction in the drawing, the isolator 122 is arranged so that the axial shift $L_2$ may be caused in the downward direction in the drawing, and the beam splitter 123 is arranged so that the axial shift $L_3$ may be caused in the upward direction in the drawing. Therefore, the total axial shift L by the correction of the mutual axial shifts can be made comparatively smaller.

In the example of FIG. 8, although the axial shift of each of the optical parts is made completely opposite in direction, the axial shift need not necessarily be made completely opposite in direction. Each of the optical parts has only to be arranged in such a direction as to at least make the total axial shift L smaller.

The axial shift direction is decided by a rotating position around an optical axis of each of the optical parts of the WDM filter 121, the isolator 122, and the beam splitter 123. Therefore, the positioning operation of the rotating direction has only to be conducted in advance so that the axial shift of each of the optical parts may become different mutually.

The axial shift amount can also be adjusted by the thickness, inclination angle or the like of each of the optical parts.

According to the third embodiment of the invention as described above, in an optical communication module where an optical parts is provided within the through hole formed in the body and a light guiding-in means and a light guiding-out means are arranged in both the end portions of the through hole, it is fixed to the body in a condition where the respective optical axes of the light guiding-in means, the optical parts, and the light guiding-out means are aligned with the central axis of the through hole, simplifying the manufacturing step, so as to reduce the number of parts.

According to the fourth embodiment of the invention, in an optical communicating module where an optical parts is provided within the body, a light guiding-in means and a light guiding-out means are arranged in both the ends thereof, the positional alignment is adapted to be conducted between the light guiding-in • guiding-out members and the body by a lens retaining member interposed respectively between the light guiding-in • guiding-out means and the body. As two positions where the adjusting operation of the XY direction can be conducted between the body and the light guiding-in • guiding-out means, the adjustment can be conducted even when a shift is provided in the angle of the optical axis, so as to make the connection loss smaller.

Further, according to the fifth embodiment of the invention, in an optical communication module where a plurality of optical parts are provided within the body and a light guiding-in means and a light guiding-out means are spliced with both the ends, it is arranged so that the axial shift between the incident light and the outputting light in the plurality of optical parts are corrected mutually, and the total axial shift amount can be made smaller and the connection loss can be made smaller.

What is claimed is:

1. An optical transmission module, comprising:
   an adjustable light guiding-in means provided at a first end of the module;
   an adjustable light guiding-out means provided at a second end of the module;
   at least one optical part arranged in the module between the light guiding-in means and the light guiding-out means;
   a first adjustable lens means arranged between the light guiding-in means and the at least one optical part; and
   a second adjustable lens means arranged between the light guiding-out means and the at least one optical part;
   whereby any of the light guiding-in means, light guiding-out means, first lens means and second lens means can be adjusted to maintain an optimum optical axis for light transmission through the module.

2. An optical transmission module, comprising:
   a module body having a through-hole formed therein, the through-hole including a central axis, a first end portion and a second end portion;
   a light guiding-in means provided in the first end portion of the through-hole;
   a light guiding-out means provided in the second end portion of the through-hole; and
   at least one optical part arranged in the through-hole between the light guiding-in means and the light guiding-out means;
   wherein the light guiding-in means, the at least one optical part, and the light guiding-out means are all aligned on the central axis of the through hole.

3. An optical transmission module according to claim 2, further comprising:
   a light beam splitter means arranged in the through-hole between the light guiding-in means and the at least one optical part;
   a mounting hole formed in the module body, the mounting hole being formed perpendicular to and in communication with the through-hole; and
   a reception optical element arranged in the mounting hole for receiving light reflected from the light beam splitter means to monitor light transmission.

4. A uni-directional optical transmission module, comprising:
   a light guiding-in means provided at a first end of the module;

a light guiding-out means provided at a second end of the module; and a plurality of optical parts arranged in the module between the light guiding-in means and the light guiding-out means;

wherein the plurality of optical parts are arranged in relation to each other such that axial shift of light passing through one optical part is at least partially corrected by axial shift of light passing through another optical part, thereby minimizing total axial shift between light entering the light guiding-in means and light exiting the light guiding-out means.

5. A uni-directional optical transmission module according to claim 4, wherein the plurality of optical parts comprises, in sequence, a WDM filter, an isolator and a beam splitter.

6. A bi-directional optical communication module, comprising:

a body portion;

a transmission optical element arranged in the body portion for transmitting light into the module;

a reception optical element arranged in the body portion for receiving light in the module;

an optical fiber arranged in the body portion for guiding light to and from the reception and transmission optical elements, respectively;

an allotment body arranged in the body portion between the transmission and reception optical elements for reflecting and allotting light received from the transmission optical element; and a light non-return chamber arranged in the body portion for receiving stray light reflected by the allotment body from the transmission optical element and the optical fiber, thereby preventing stray light from reflecting into the reception optical element and minimizing cross talk in the module.

7. A bi-directional optical communication module according to claim 6, wherein the light non-return chamber comprises a concave chamber portion provided in the body portion, a cover member arranged on an inner end face of the concave portion, and a pin hole arranged between the concave chamber portion and the allotment body for allowing stray light received from the allotment body to enter the concave chamber portion.

8. A bi-directional optical communication module according to claim 7, wherein the cover member is a light-absorbing material.

9. A bi-directional optical communication module according to claim 7, wherein the pin hole has a maximum diameter of 0.5 mm.

10. A uni-directional optical transmission module, comprising:

a body portion;

a light guiding-in means arranged in the body portion;

a light guiding-out portion arranged in the body portion;

an allotment body for transmitting light received from the light guiding-in means;

an optical receiving element arranged in the body portion to receive light reflected from the allotment body and monitor the transmission of light;

at least one optical module device arranged between the allotment body and the light guiding-out means; and a light non-return chamber arranged in the body portion for receiving and diffusing return light reflected by the allotment body from the at least one optical module device.

11. A uni-directional optical transmission module according to claim 10, wherein the light non-return chamber comprises a concave chamber portion provided in the body portion, a cover member arranged on an inner end face of the concave portion, and a pin hole arranged between the concave chamber portion and the allotment body for allowing return light reflected by the allotment body to enter the concave chamber portion.

12. A uni-directional optical transmission module according to claim 11, wherein the cover member is a light-absorbing material.

13. A uni-directional optical transmission module according to claim 11, wherein the pin hole has a maximum diameter of 0.5 mm.

14. A uni-directional optical transmission module according to claim 10, wherein the light non-return chamber comprises a concave chamber portion provided in the body portion, and a light-absorbing cover material arranged on an inner surface of the concave portion.

15. A uni-directional optical transmission module according to claim 10, wherein the light non-return chamber comprises a concave chamber portion provided in the body portion, and the concave chamber portion has an inner end face arranged as an inclined face in relation to the direction of the return light reflected into the chamber.

16. A uni-directional optical transmission module according to claim 10, wherein the light non-return chamber comprises a concave chamber portion provided in the body portion, and the concave chamber portion has an inner rough end face.

* * * * *